(12) United States Patent
Yang

(10) Patent No.: US 10,769,279 B2
(45) Date of Patent: Sep. 8, 2020

(54) SECURE ELEMENT OPERATING SYSTEM UPDATE NOTIFICATION

(71) Applicant: Apple Inc., Cupertino, CA (US)

(72) Inventor: Xiangying Yang, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/026,912

(22) Filed: Jul. 3, 2018

(65) Prior Publication Data

US 2019/0065749 A1 Feb. 28, 2019

Related U.S. Application Data

(60) Provisional application No. 62/549,787, filed on Aug. 24, 2017.

(51) Int. Cl.
G06F 9/44 (2018.01)
G06F 21/57 (2013.01)
G06F 8/65 (2018.01)
H04W 4/12 (2009.01)
H04L 29/08 (2006.01)
G06F 21/74 (2013.01)
G06F 21/33 (2013.01)

(52) U.S. Cl.
CPC ............ *G06F 21/572* (2013.01); *G06F 8/65* (2013.01); *G06F 21/74* (2013.01); *H04L 67/30* (2013.01); *H04L 67/34* (2013.01); *H04W 4/12* (2013.01); *G06F 21/33* (2013.01)

(58) Field of Classification Search
CPC .................................................... G06F 21/572
USPC ............................................................ 717/168
See application file for complete search history.

(56) References Cited

U.S. PATENT DOCUMENTS 7,487,345 B2 * 2/2009 Khatri ................. G06F 8/64
713/100
7,512,401 B2 * 3/2009 Muhonen ............ G06F 8/61
455/414.1

(Continued)

OTHER PUBLICATIONS

"GlobalPlafform Card Technology—Open Firmware Loader for Tamper Resistant Element," GlobalPlafform, Inc., Version 1.0.1, Public review, Feb. 2017, GPC_FST_134, 53 pages.

(Continued)

Primary Examiner — Evral E Bodden
(74) Attorney, Agent, or Firm — Dickinson Wright RLLP

(57) ABSTRACT

An operating system (OS) update to a secure element (SE) may be commanded, for example, in order to fix a security bug, upgrade a version of an OS, provide mobile network operator (MNO) specific extensions such as to an application programming interface (API) or to cause OS/profile switching. Many of these OS updates will affect one or more profiles present on the SE. An MNO associated with a given profile will benefit in some instances by being provided with a notification of the OS update, since the OS update may affect SE capabilities and thus affect what a given profile can or cannot do after the OS update occurs. Embodiments provided herein create notification entries that will appropriately inform the concerned MNO. In some embodiments, a capability linking variable ("linkedcapability") is used to determine whether an SE capability change should trigger transmission of a notification to the concerned MNO.

20 Claims, 10 Drawing Sheets

(56) References Cited

U.S. PATENT DOCUMENTS

| | | | |
|---|---|---|---|
| 8,244,856 B2* | 8/2012 | Appleton | H04L 63/0272 709/217 |
| 8,532,149 B2* | 9/2013 | Van Greunen | H04L 41/00 370/389 |
| 8,768,962 B2* | 7/2014 | Laron | G06F 16/1734 707/781 |
| 2008/0005733 A1* | 1/2008 | Ramachandran | G06F 8/65 717/168 |

OTHER PUBLICATIONS

"RSP Technical Specification, Version 2.0," GSM Association, Oct. 14, 2016, 229 pages.
"Smart Cards; Card Application Toolkit (CAT); Release 14," ETSI TS 102 223, Version 14.0.0, May 2017, 247 pages.

* cited by examiner

EACH PROFILE MAY CONTAIN:
PROFILE MANAGEMENT OPERATION 331
RECIPIENT ADDRESS 332
LINKEDCAPABILITY 333

NOTIFICATION ENTRY IN LIST:
SEQUENCE NUMBER 341
OS UPDATE OPERATION 342
RECIPIENT ADDRESS 343
ICCID 344
NEW OS VERSION 345
NEW SE CAPABILITY 346
SE SIGNATURE 347
SE CERTIFICATE 348 (OPTIONAL)

SECURE ELEMENT OPERATING SYSTEM UPDATE NOTIFICATION

CROSS-REFERENCE TO RELATED APPLICATIONS

The present application claims the benefit of U.S. Provisional Application No. 62/549,787, entitled "SECURE ELEMENT (SE) OPERATING SYSTEM (OS) UPDATE NOTIFICATION," filed Aug. 24, 2017, which is incorporated herein by reference in its entirety for all purposes.

FIELD

The described embodiments relate to generating and delivering notifications when a secure element (SE) operating system (OS) is updated, including delivery of the notifications to network-based servers of one or more cellular wireless service providers.

BACKGROUND

The OS of an SE of a wireless device may be updated. An SE may also be referred to as a removable universal integrated circuit card (UICC) or an embedded UICC (eUICC). An eUICC is an SE for hosting one or more profiles, which may also be referred to as subscriber identity modules (SIMs), when installed on a UICC, or as electronic SIMs (eSIMs), when installed on an eUICC. A profile includes a combination of operator data and applications provisioned on a UICC/eUICC of a device for the purposes of providing access to services of a cellular wireless network service provider or mobile network operator (MNO). A profile can contain secure data used to prove identity and thus verify contract rights for access to one or more services provided by the MNO.

A profile can be identified by a unique number called an ICCID (Integrated Circuit Card Identifier). Profile management can include a combination of local and remote management operations such as enabling, disabling profile, adding, deleting, and querying profiles present on a UICC/eUICC. In some cases, a wireless device is user equipment used in conjunction with a UICC/eUICC to connect to a mobile network. In a machine-to-machine (M2M) environment, a wireless device may not be associated with a user and may have no user interface. An end user is a person using a (consumer or enterprise) device. An enabled profile can include files and/or applications that are selectable over an interface between a UICC/eUICC and processing circuitry external to the UICC/eUICC and included in the wireless device.

A functional entity that provides profile packages can be referred to as a subscription manager data preparation (SM-DP, or SM-DP+) server, also known as an eSIM server. An SM-DP server may also be referred to as a profile provider or an eSIM vendor. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The SM-DP server communicates over an interface with an eUICC. Certificates used for authentication and confidentiality purposes can be generated by a trusted certificate issuer.

An eUICC includes an operating system, and the operating system can include an ability to provide authentication algorithms to network access applications associated with a given operator. The operating system can also include an ability to translate profile package data into an installed profile using a specific internal format of the eUICC. An ISD-P (issuer security domain—profile) can host a unique profile within an eUICC. An ECASD (embedded UICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel for communication of profiles and/or updates thereto. OTA keys are credentials used by an operator for remote management of operator profiles on an eUICC.

Network, device, SE and profile interactions are described in Global System for Mobile Communications (GSM) Association document (GSMA) SGP.22: "RSP Technical Specification," Version 2.0 Oct. 14, 2016 (hereinafter "SGP.22"), where RSP stands for Remote SIM Provisioning. Some topics related to firmware updates are covered in the Global Platform® document, "Open Firmware Loader for Tamper Resistant Element," version 1.0.1, February 2017 (hereinafter "GP Loader"). Some SE procedures for sending information are given in "Smart Cards: Card Application Toolkit (CAT)," European Telecommunications Standards Institute (ETSI) Technical Specification (TS) 102.223 v14.0.0, May, 2017 (hereinafter "ETSI 102.223").

SUMMARY

Representative embodiments set forth herein disclose various systems and techniques for recognizing when an event notification pulled from a root server is stale, that is, the event has already been processed.

In some embodiments, a secure element (SE) includes one or more processors and a memory storing instructions that, when executed by a processor of the one or more processors, cause the SE to perform operations including: (i) performing an operating system (OS) update of the SE, and (ii) sending a notification associated with the OS update to a mobile network operator (MNO).

In some embodiments, an SE includes one or more processors and a memory storing instructions that, when executed by a processor of the one or more processors, cause the SE to perform operations including: (i) performing an operating system (OS) update of the SE, (ii) fetching a first value that indicates those SE capabilities for which a notification should be sent, where the first value is associated with a first profile present on the SE, and (iii) forming a second value that indicates those SE capabilities that are affected by the OS update. When a comparison of the first value with the second value indicates that at least one SE capability has changed due to the OS update for which a notification should be sent for the first profile, the method includes providing a notification entry associated with the OS update to an MNO. In some embodiments, the first value includes a linkedcapability value. In some embodiments, the second value includes a capabilityindication value. In some embodiments, the providing includes sending the notification entry over a bearer independent protocol (BIP) channel. In some embodiments, the providing includes entering a notification entry in a notification list that will subsequently be fetched by a local profile assistant (LPA) of a device housing the SE. In some embodiments, the SE sends a refresh command to the LPA after the OS update to enable the device to be notified of the changes to the SE that have occurred due to the OS update.

In some embodiments, an SE on which one or more profiles are present performs a method that includes receiving an operating system (OS) update command. The method further includes, when the OS update command will cause a profile state change, prior to performing the OS update command, the SE creates a state change notification entry in a notification list for each profile of the one or more profiles that will undergo a change of state. The method also includes the SE performing the OS update. When the OS update command will cause an SE capability change for which a notification should be sent for at least one profile of the one or more profiles, the method creates a capability change notification in the notification list for the at least one profile. The method also includes providing entries from the notification list to one or more MNOs associated with the one or more profiles.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Firmware, including operating systems may be updated or replaced. For example, GP Loader describes a firmware loader specification that may be used to provide firmware updates for a tamper resistant secure element (SE).

Operating system updates may be performed to provide security bug fixes, OS version upgrades, service provider specific extensions (e.g., a new platform API (application programming interface)), and OS/profile switching. An example of OS/profile switching includes changing from a first OS associated with a first MNO to a second OS associated with a second MNO. Another example of OS/profile switching includes changing from an SE OS without near field communication (NFC) support to an SE OS that supports NFC, such as for use with NFC payment applications.

An SE of a device may have two or more profiles present on the SE. In some scenarios, a first profile may be optimized for use with a first operating system provided by a first vendor, while a second profile may be optimized for use with a second operating system provided by a second vendor. As a result of an OS update, the SE OS may be changed from the first OS to the second OS, and this OS update can affect the performance of the first profile. In most cases, the OS update also changes the capabilities of the SE. Exemplary SE capabilities are described in SGP.22 and can be obtained by a device hosting the SE using a GetEUIC-CInfo command.

Examples of SE capabilities are provided in the EUIC-CInfo1 and EUICCInfo2 data structures of SGP.22. EUIC-CInfo1 includes, for example, a variable "svn" which represents a GSMA SGP.22 version that is supported. EUICCInfo2 includes, for example, a variable "ppVersion" which represents a Protection Profile version that is supported. EUICCInfo2 also includes variables "javacardVersion" and "globalplatformVersion." EUICCInfo2 includes a variable "profileVersion", which indicates a SIMAlliance Profile package supported.

Because the SE capability usually changes after an OS update, some services or applications supported by a profile may or may not work after the OS update. Thus, an MNO associated with the profile will benefit by being informed when an OS update has occurred.

Basic Logic

Figure 1:
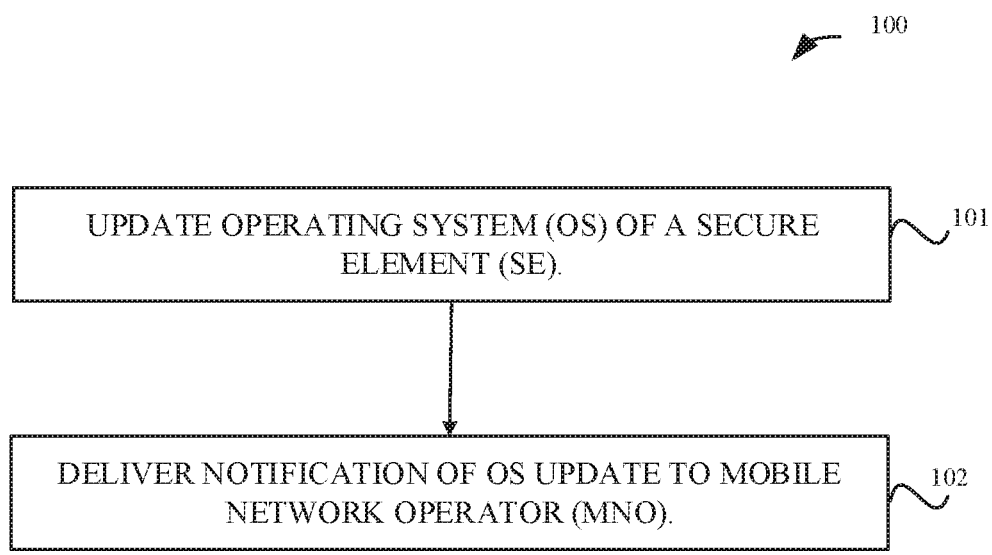
FIG. 1 illustrates exemplary logic for providing a notification related to an OS update, according to some embodiments.

FIG. 1 illustrates exemplary logic 100 related to providing a notification to an MNO. At 101, an SE OS is updated. At 102, a notification is delivered to an MNO. In some embodiments, the notification may be delivered in anticipation of the OS update.

System

Figure 2:
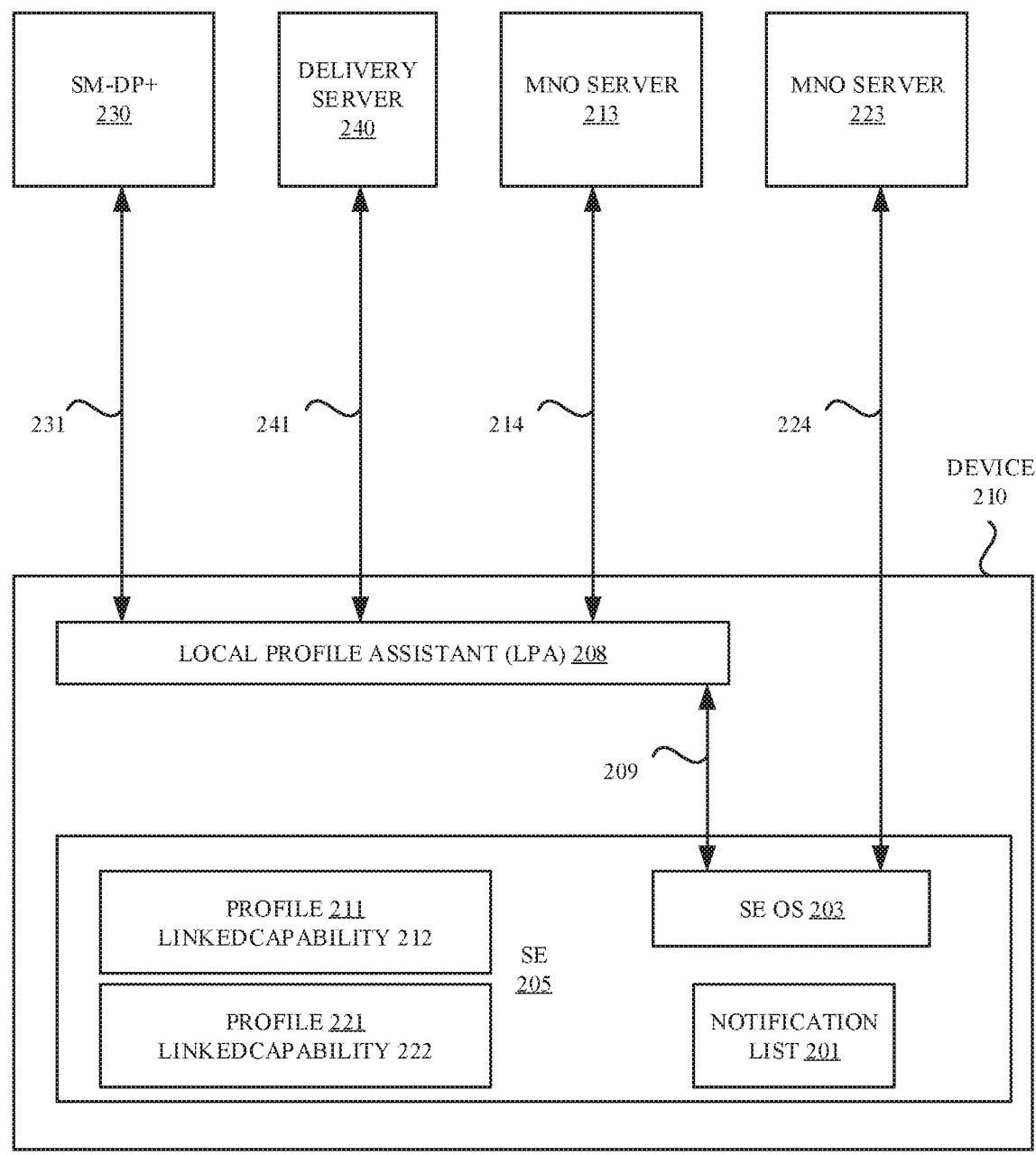
FIG. 2 illustrates an exemplary system for providing a notification related to an OS update, according to some embodiments.

FIG. 2 illustrates an exemplary system 200 including an SM-DP+ 230, a delivery server 240, an MNO server 213, and an MNO server 223 in communication with a device 210 housing an SE 205. The device 210 includes a local profile assistant (LPA) 208. Various interfaces are defined in SGP.22. FIG. 2 illustrates communication via interfaces 231, 241, and 214 to the LPA 208. FIG. 2 also illustrates MNO server 223 communicating with the SE 205 via an interface 224. The LPA 208 communicates with the SE OS 203 via an interface 209. These interfaces are exemplary, please see SGP.22 for a complete illustration of network, device, SE, and profile interfaces. Some attributes of OS updating, such as delivery server 240, can be found in the GP Loader document.

The SE 205 is shown with two profiles present: profile 211 and profile 221. In general, there may be one or more profiles on the SE 205. At least one profile includes an exemplary linked capability variable. For example, the profile 211 includes a linkedcapability variable 212 and the profile 221 includes a linkedcapability variable 222. The SE 205 also includes a notification list 201.

Message Flow, LPA Fetches Notification List

Figures 3A, 3B, 3C:
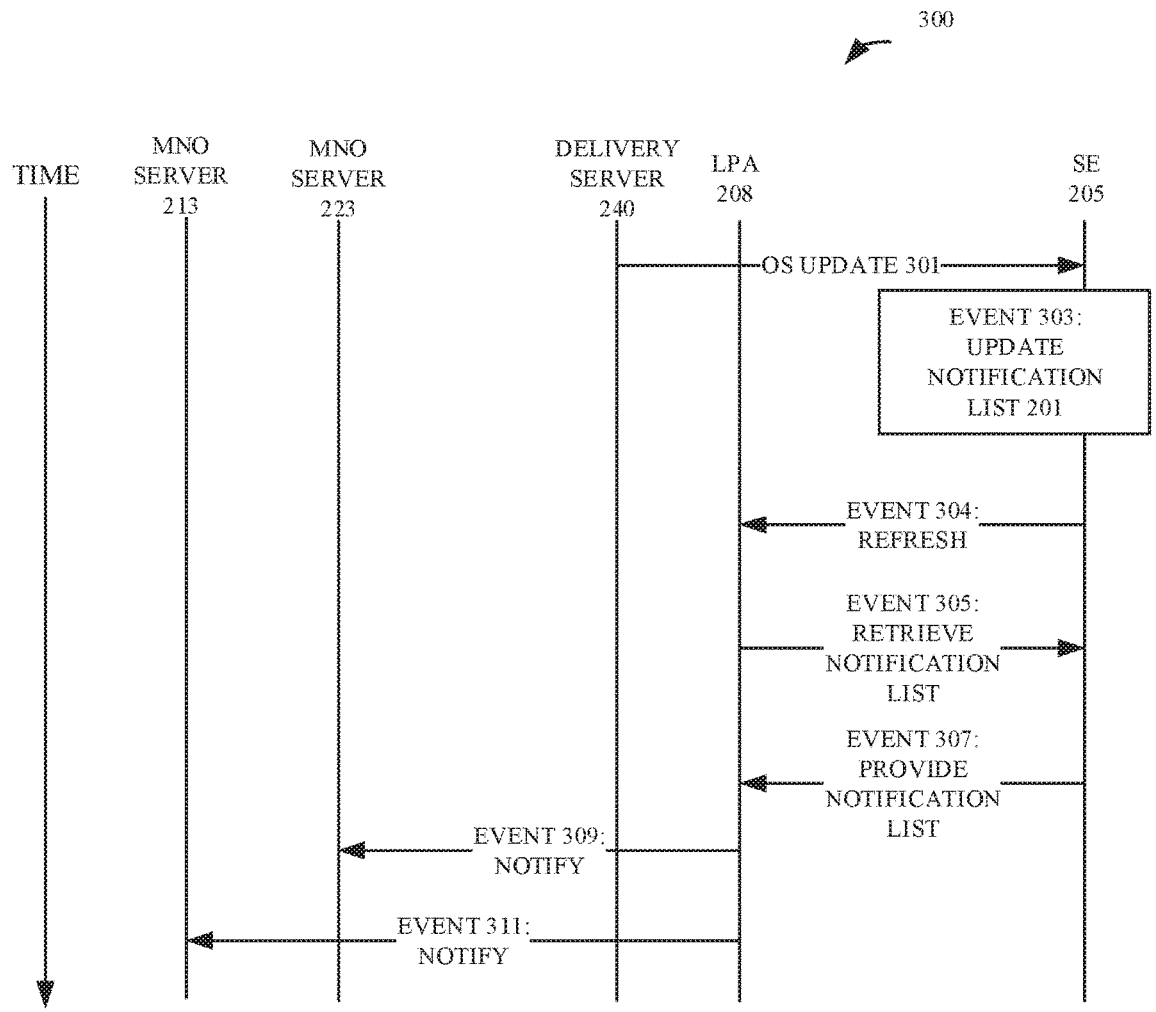
FIG. 3A illustrates an exemplary message flow for providing, by a device local profile assistant, notifications related to an OS update, according to some embodiments.
FIG. 3B illustrates exemplary profile notification configuration information, according to some embodiments.
FIG. 3C illustrates exemplary notification content, according to some embodiments.

FIG. 3A illustrates an exemplary message flow 300 in which notification list 201 is updated in relation to an OS update 301 and then notification entries are propagated to MNO servers 213 and 223 based on action of the LPA 208. Time is shown advancing from top to bottom. Entity names are given across the top of the figure. Each entity name is associated with a vertical time line. Arrows beginning or ending on a vertical timeline indicate transmission or reception by the associated entity. More details on notification delivery can be found in SGP.22.

The action begins with the delivery server 240 performing an OS update 301 on the SE 205. Next, at event 303, the SE 205 updates notification list 201. In some embodiments, the notification list is updated in anticipation of the OS update 301. The SE 205, in some embodiments, then sends a refresh command at event 304 to the LPA 208. The refresh command, in some embodiments, indicates that an OS update, such as OS update 301, has occurred. Implementation of a refresh command is discussed in TS 102.223.

After event 304, event 305 occurs in which the LPA 208 retrieves any notifications pending in the SE 205. At event 307, the SE 205 provides the notification list 201 to the LPA 208. The LPA 208 then goes through the list and notifies target entities. Generally, this could include an eSIM server, for example, the SM-DP+ 230. In the context of this application, the notifications are going to MNO servers. For example, at event 309, the LPA 208 sends a notification related to the OS update 301 to the MNO server 223 related to the profile 221. At event 311, the LPA 208 sends a notification related to the OS update 301 to the MNO server 213 related to the profile 211.

Notification Configuration, Per Profile

FIG. 3B illustrates notification configuration information 330 present in a profile, for example, the profile 211 and/or the profile 221. In particular, the notification configuration information 330 includes a profile management operation 331 for which a notification should be sent and a recipient address 332 telling who the notification should be sent to. In some embodiments the recipient address 332 is a fully qualified domain name (FQDN). An example of an FQDN address is "notifcationAddrOSUpdate." The linkedcapability variables 212 and 222 are instances of the variable linkedcapability 333.

Nature of Notification Entry

FIG. 3C illustrates an exemplary notification entry 340. Entry 340 is an example of one entry in the notification list 201. Exemplary content of a notification entry can include a sequence number 341, an OS update operation 342, a recipient address 343, a profile identifier (ICCID) 344, a new OS version 345, a new SE capability 346, an SE signature 347 performed over the entry content and an SE certificate 348.

Message Flow, SE Pushes Notification List Entries

Figure 3D:
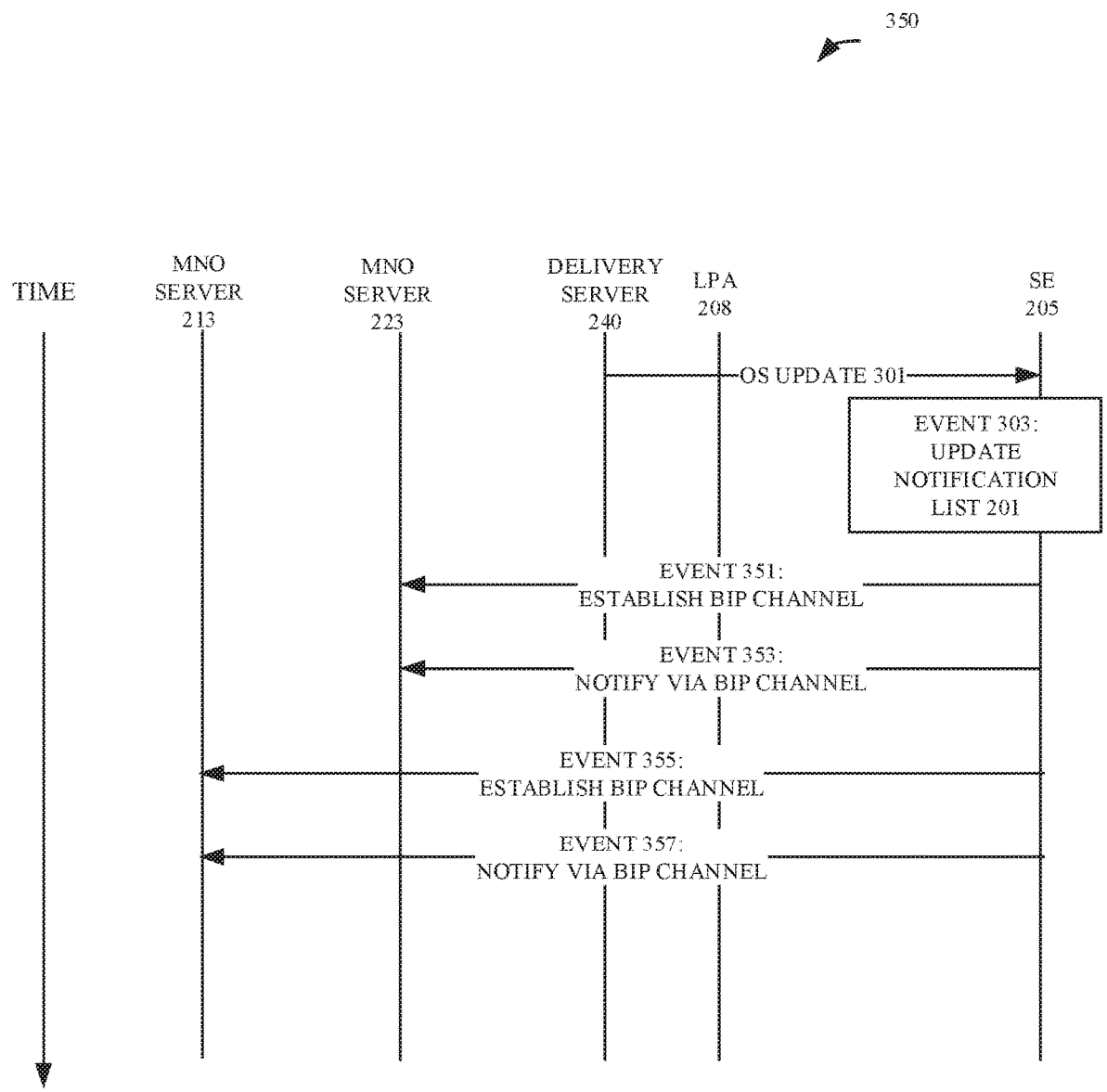
FIG. 3D illustrates an exemplary message flow for providing, by use of bearer independent protocol (BIP) channels, notifications related to an OS update, according to some embodiments.

FIG. 3D illustrates a message flow 350 in which the SE 205 establishes BIP channels in order to convey notifications to the MNO servers 213 and 223. Exemplary details of BIP can be found in ETSI 102.223. OS update 301 and event 303 occur in a similar fashion to these items in FIG. 3A. After update of the notification list, the SE 205, at event 351, establishes a BIP channel to the MNO server 223. At event 353, the SE 205 pushes a notification entry to the MNO server 223 related to the profile 221. At event 355, the SE 205 establishes a BIP channel to the MNO server 213. At event 357, the SE 205 pushes a notification entry to the MNO server 213 related to the profile 211.

Logic, No Check of Affected Capability

Figure 4:
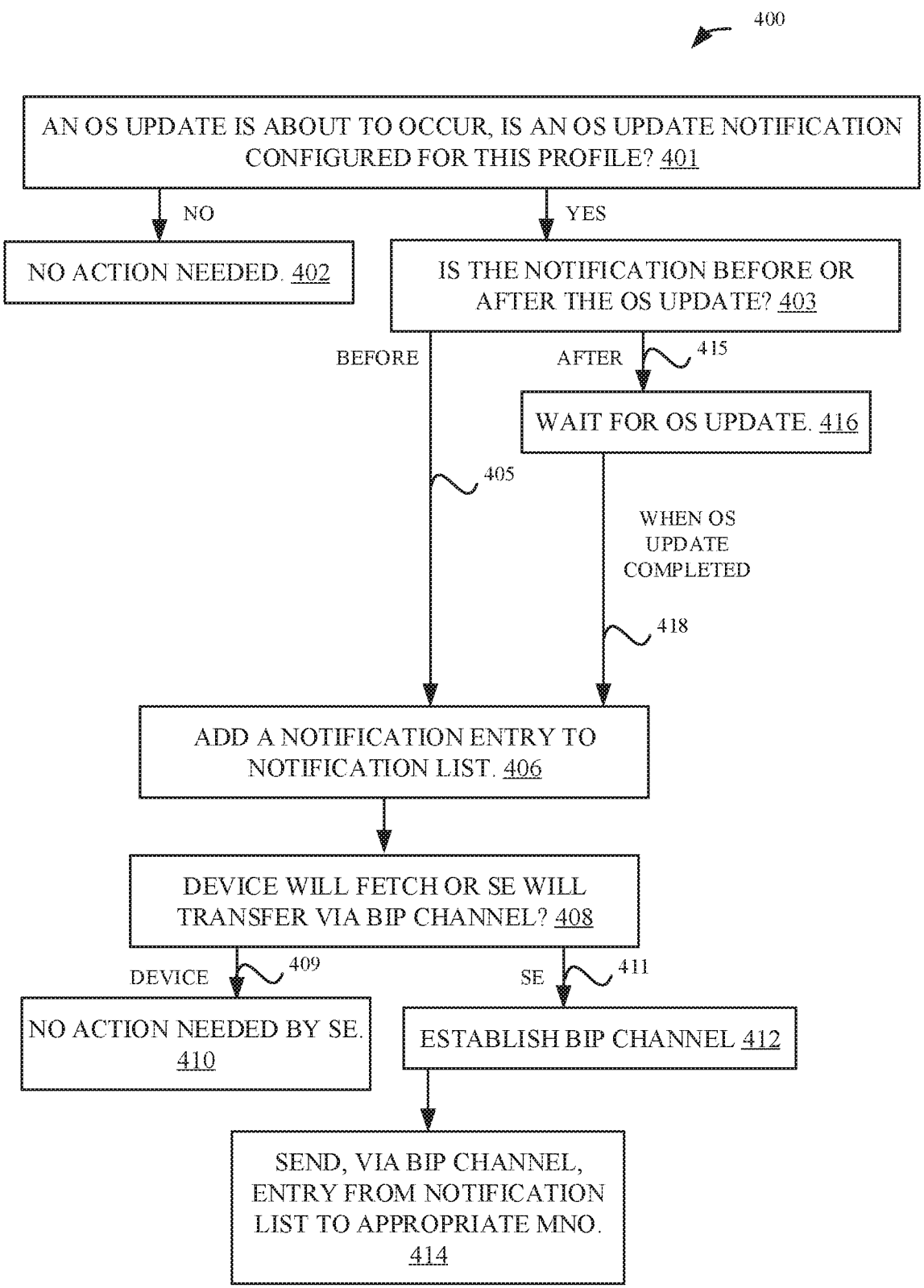
FIG. 4 illustrates exemplary logic for providing a notification related to an OS update, according to some embodiments.
Figure 5:
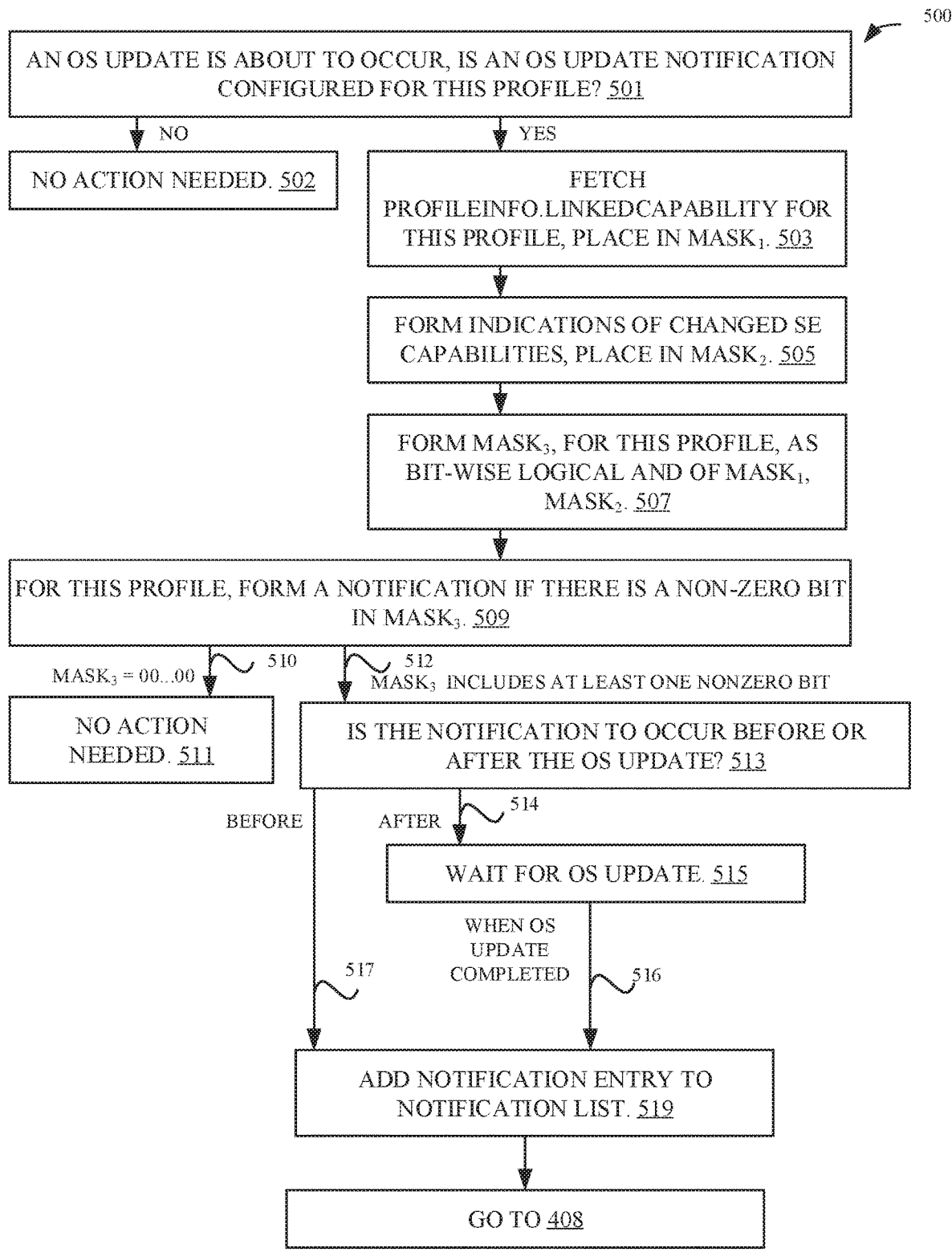
FIG. 5 illustrates exemplary logic for determining whether a notification should be sent related to an OS update, and if so, sending the notification, according to some embodiments.

FIG. 4 illustrates exemplary logic 400 performed by an SE in which an OS update causes a notification without a check of affected capability. FIG. 5, in contrast, performs a check of affected capability before sending a notification.

Generally, notifications occur on a per profile basis. For example, as shown in FIG. 3B, a profile can contain an indication profile management operation 331. If this variable indicates that a notification should be sent if an OS update occurs, then a notification will be sent to the MNO associated with the particular profile when an OS update occurs. In FIG. 4, the action begins at 401 with a determination of whether OS update notification is configured for this profile, for example, by checking the value in a variable such as profile management operation 331. If the answer is no, the logic flows to 402 and no notification action is needed. When the answer is yes, the logic flows to 403.

At 403, the logic 400 determines whether the notification should occur before or after the OS update. If the answer is before, then the logic flows by 405 to 406 and a notification entry is added to a notification list. Exemplary fields of a notification entry are shown in FIG. 3C. However, if the check in 403 determines that the notification is to be performed after the OS update, then the logic flows via 415 to 416 and waits for the OS update to occur. When the OS update is completed, the logic flows via 418 to 406 and a notification entry is added to the notification list.

At 408, the logic determines whether the message flow of FIG. 3A or FIG. 3D is applicable. That is, the logic 400 determines at 408 whether the device will fetch the notification list or whether instead the SE will transfer notification entries via a BIP channel. If the SE is configured to be passive and await device action, then the logic flows by 409 to 410 and no action is needed by the SE to push out the notification list, except the local refresh operation between device and SE upon completion of the OS update (see event 304 of FIG. 3A). However, if the SE is configured to send the notifications to the MNO for this profile by a BIP transmission, then the logic flows via 411 to 412 and the SE establishes a BIP channel to the MNO associated with the profile under consideration. Then, at 414, the SE sends, via the BIP channel, the entry related to this profile to the MNO.
Logic, Only Send if the Profile Indicates Notification for the Affected Capability FIG. 5 provides exemplary logic 500 performed by an SE which includes checking variables of the type linkedcapability 212 discussed above with respect to FIGS. 2 and 3B. The logic at 501 is similar to that at 401. If no update is configured for this profile, the logic flows to 502 and no action is needed. However, if a notification is possible for this profile after an OS update, the logic flows to 503. At 503, the logic fetches the linkedcapability value from the profile information data structure ("profileinfo") and places it in a temporary variable, here called mask1. Then, at 505, the SE populates a temporary variable $mask_2$ with Boolean indications of the SE capabilities affected by the OS update.

The ordering of capabilities in $mask_1$ and $mask_2$ is the same. For purposes of an example to discuss, let the mask bits be denoted $b_0b_1b_2b_3b_4b_5$. For example, $b_0$, the leftmost bit of $mask_2$, in some embodiments, indicates if the SIMAlliance Profile package version that is supported by the OS has changed. This is the EUICCInfo1variable "profileVersion" mentioned earlier. In this example the value of $b_0$ of $mask_1$ will indicate whether the MNO for this profile desires a notification when the SIMAlliance Profile package version supported by the OS changes. As a further example, suppose $b_3$, the fourth bit from the left in $mask_1$, indicates whether the MNO wishes to be notified when the "ppVersion" variable changes. If $b_3=1$ ("true"), then the MNO wishes to be notified if the ppVersion variable changes due to the OS update.

To review, at 505, the SE has placed logical true values in bit positions of $mask_2$ for each SE capability that has changed. For the example variables mentioned above, bit positions in $mask_2$ corresponding to the same capabilities signaled by bit positions of $mask_1$ will indicate, for this particular OS update, whether the "profileVersion" and "ppVersion" variables of EUICCInfo2 have changed due to this OS update. At 507, the logic 500 performs a bitwise logical AND operation between $mask_1$ and $mask_2$ and places the result in $mask_3$. For example, if $mask_1=100100_2$ and $mask_2=111000_2$, then $mask_3=100000_2$. At 509, the logic forms a notification if there is a non-zero bit in $mask_3$.

If $mask_3$ is all 0's, then the logic flows by 510 to 511 and no notification is needed for this profile for this OS update. This feature is important to conserve network bandwidth and to avoid many unnecessary notifications arriving at the MNO for this profile.

In this example, the linkedcapability value in $mask_1$ indicated that a notification should be sent if profileVersion changed, and the corresponding bit ($b_0$) of $mask_2$ indicated that profileVersion changed; this resulted in $b_0$ of $mask_3$ being a 1. For this example, the logic will flow via 512 to 513.

Next the logic determines at 513 whether the notification is to occur before or after the OS update. Similarly to FIG. 4 and the path to 406 via 405, or the waiting path 415 to 416 to 406 via 418, the logic will progress via 517 to 519 or use the waiting path of 515 via 514 and then reaching 519 via 516. Finally, at 519 a notification entry will be added to the notification list. The logic then flows from 519 to 408 to determine whether to wait for a device fetch of the notification list (possibly after a refresh command) or to actively establish a BIP channel and push the notification to the MNO. Either way, a notification will be sent to the MNO associated with the profile being considered in this passage through logic 500.

Possible Profile Change, Notification

Figure 6:
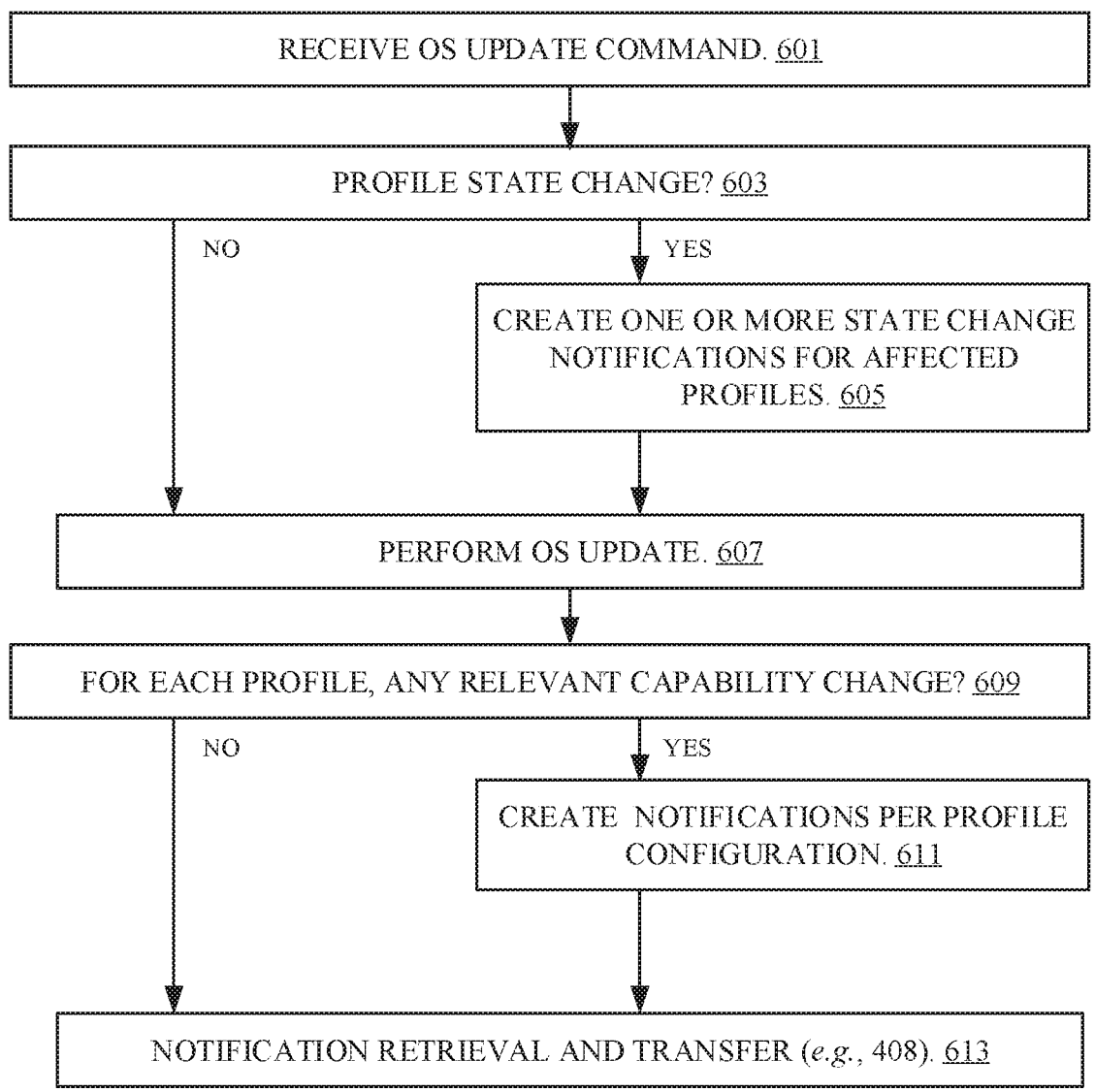
FIG. 6 illustrates exemplary logic for sending a notification related to an OS update when a profile state may have changed, according to some embodiments.

FIG. 6 provides exemplary logic 600 which accommodates notification of profile state changes (e.g., enable, disable, delete). At 601, the SE receives an OS update command. At 603, the SE determines whether implementation of the command will change a profile state. If there will be no profile state change, the logic flows to 607. If there will be a profile state change, then the logic flows to 605 and the SE creates state change notifications. In either case, the logic arrives at 607 and the SE performs the SE update. Next, similarly to the logic 500 of FIG. 5, the SE determines at 609 for each profile, whether there have been any relevant capability changes. This determination can be done by applying the logic of 503 (loading $mask_1$ with the linked-capability information), logic 505 (loading $mask_2$ with the indications of changed capabilities), and the logic of 507 (forming $mask_3=mask_1$ && $mask_2$, where "&&" represents bit-wise logical AND between two bitstrings). If $mask_3$ has at least one nonzero bit, the logic flows to 611 and appropriate notifications are created and then the logic flows to 613. If $mask_3$ is all 0's then the logic bypasses 611 to reach 613. Finally at 613, if at least one notification has been created by the logic 605 or 611, the notifications are retrieved and transferred to the appropriate MNOs. This can be done using, for example, the logic of FIG. 4 starting at 408.

Example Connection Methods

Figure 7:
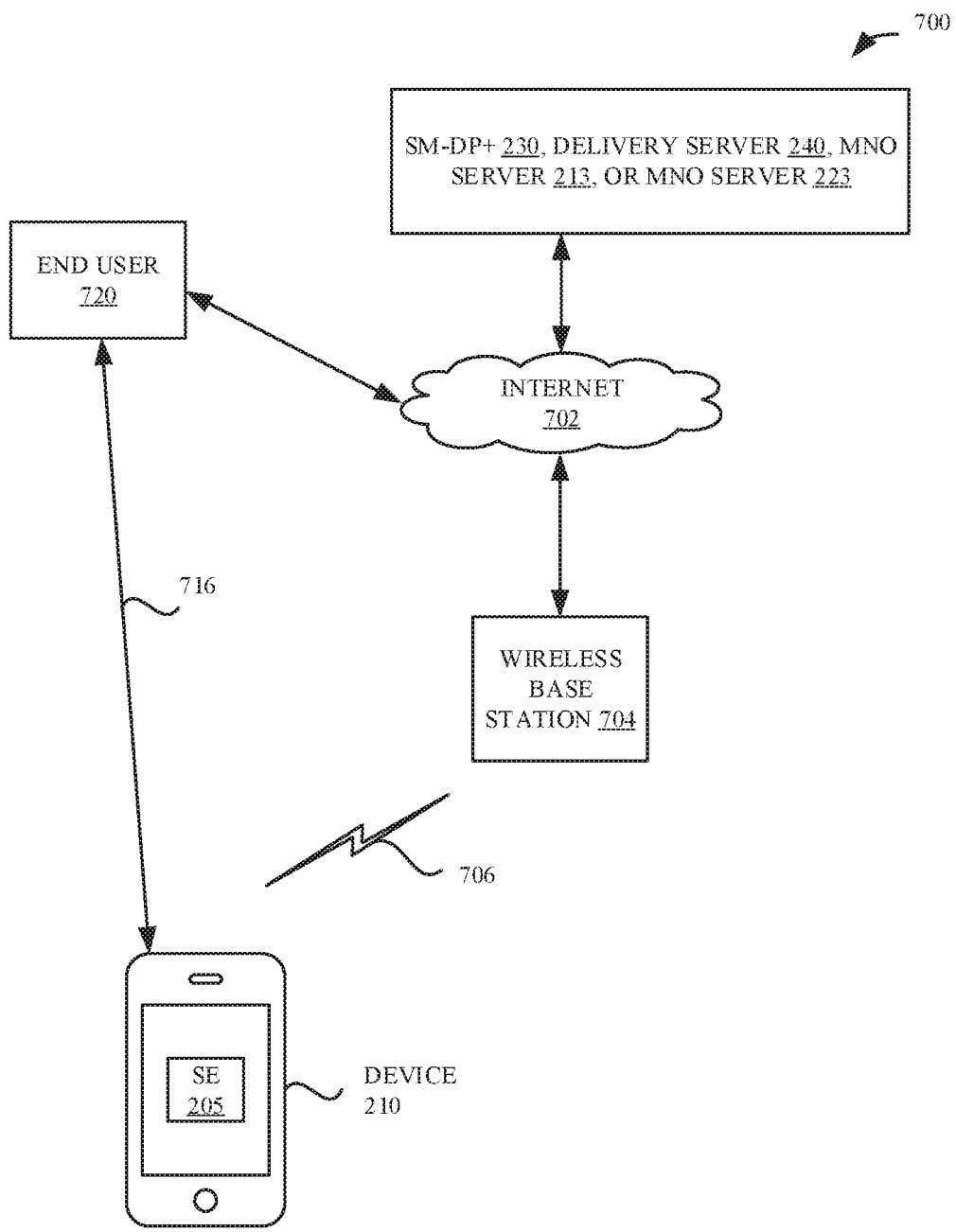
FIG. 7 illustrates exemplary interconnections of the system of FIG. 2, according to some embodiments.

FIG. 7 illustrates example connection methods for performing notifications from SE 205 housed in the device 210 in a system 700. The SM-DP+ 230, the delivery server 240, the MNO server 213 and the MNO server 223 are each connected to the Internet 702. End user 720 can locally manage device 210 using interface 716 which can represent end user actions. The end user 720 can also remotely manage device 210 via the Internet 702. The device 210 is shown connected to a wireless base station 704. The wireless base station 704 communicates with the device 210 via a wireless link 706. The wireless base station 704 can be an Institute of Electronic and Electrical Engineers 802.11 Wireless Fidelity (IEEE 802.11 Wi-Fi) access point (AP) or the wireless base station 704 can be, for example, a cellular mobile network base station. Examples of cellular mobile network base stations are a 2G or 3G base station or an LTE eNode B. The device 210 can also connect to the Internet 702 via a wired connection (not shown).

Further SE and Profile Details

Figure 8:
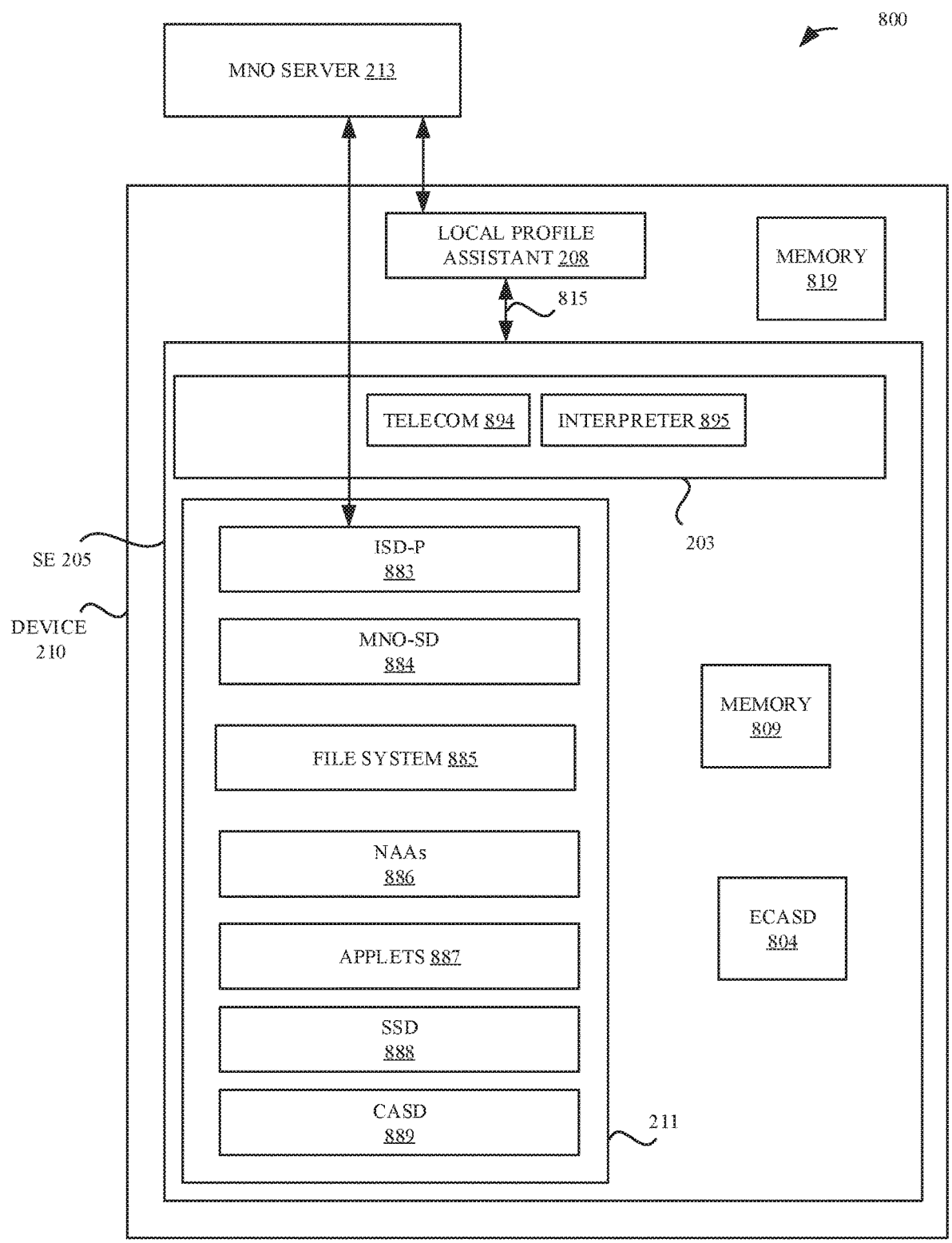
FIG. 8 illustrates further details of the SE and device of the exemplary system of FIG. 2, according to some embodiments.

FIG. 8 illustrates further details of the SE 205 in a system 800. The SE 205 includes an operating system 203. Within the operating system 203 is a telecom framework 894 which provides authentication algorithms to network access applications (such as NAAs 886). Interpreter 895 translates profile package data into an installed profile using a specific internal format of the SE 205. ISD-P 883 hosts the profile 211. An event processed by the device 210 with the SE 205 can include, for example, installing, enabling, or disabling of the profile 211 in cooperation with the SM-DP+ 230 (see FIGS. 2 and 7).

The ISD-P is a secure container (security domain) for the hosting of the profile 211. The ISD-P is used for profile download and installation in collaboration with the interpreter 895 for the decoding of a received bound profile package. ECASD 804 provides secure storage of credentials required to support the security domains on SE 205. MNO-SD 884 is the representative on the SE 205 of an operator, e.g., the MNO operating MNO server 213, providing services to the end user 720. The MNO-SD 884 contains the operator's OTA keys and provides a secure OTA channel. Further description of profile management in an SE can be found in SGP.22.

The profile 211 also generally includes a file system 885, applets 887, and a supplemental security domain (SSD) 888. The profile 211 may also include its own controlling authority security domain (CASD) 889.

The notification list described herein, in some embodiments, is stored in device 210 memory 819 and/or SE 205 memory 809.

The MNO server 213 communicates with the device 210, in some embodiments, via the local profile assistant 208. The local profile assistant communicates with the SE 205 via the interface 815. The MNO server 213 also communicates with the profile 211 directly as shown.

Variety of Radio Access Technologies

Wireless devices and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or user equipment (UE) can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 9:
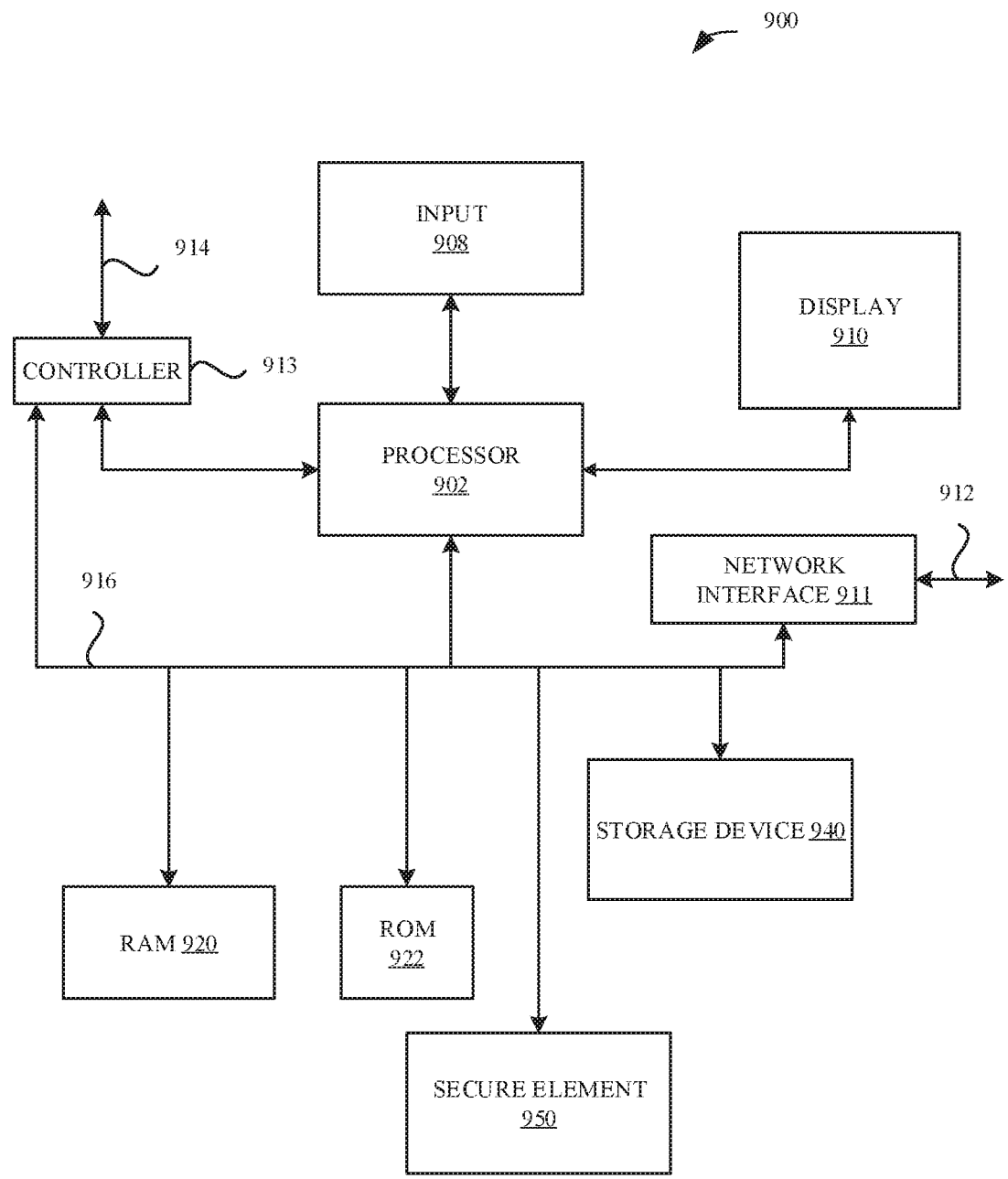
FIG. 9 illustrates an exemplary apparatus for implementation of the embodiments disclosed herein.

FIG. 9 illustrates in block diagram format an exemplary computing device 900 that can be used to implement the various components and techniques described herein, according to some embodiments. In particular, the detailed view of the exemplary computing device 900 illustrates various components that can be included in the device 210, the SE 205, and the MNO servers 213 and 223 illustrated in FIGS. 2, 3A, 3D, 7, and 8. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor.

The computing device 900 also includes the storage device 940, which can include a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900. The computing device 900 also includes a secure element 950. In some embodiments, the secure element 950 is an eUICC.

Representative Embodiments

In some embodiments, a secure element (SE) includes a memory and one or more processors, where the memory includes instructions that, when executed by a processor of the one or more processors, cause the SE to perform operations including: (i) performing an operating system (OS) update of the SE, (ii) comparing a first value associated with a first profile present on the SE, the first value indicating those SE capabilities for which a notification should be sent, with a second value that indicates those SE capabilities that are affected by the OS update, and (iii) when the comparing of the first value with the second value indicates that at least one SE capability has changed due to the OS update for which a notification should be sent for the first profile, providing a notification entry associated with the OS update to a mobile network operator (MNO).

In some embodiments, the first value includes a linked-capability value. In some embodiments, the second value includes a capabilityindication value. In some embodiments, the providing includes sending the notification entry to a network-based server of the MNO over a bearer independent protocol (BIP) channel. In some embodiments, the providing includes entering the notification entry in a notification list to be fetched subsequently by a local profile assistant (LPA) of a device that includes the SE. In some embodiments, the operations performed by the SE further include sending a refresh command to the LPA of the device after entering the notification entry in the notification list to cause the LPA of the device to fetch the notification list that includes notification entry. In some embodiments, the LPA of the device sends a notification to a network-based server of the MNO based on the notification entry in the notification list.

In some embodiments, a method performed by a secure element (SE) on which one or more profiles are present includes: (i) receiving an operating system (OS) command to perform an OS update; (ii) when the OS update command will cause a profile state change for one or more profiles on the SE, prior to performing the OS update, creating a state change notification entry in a notification list for each profile of one or more profiles; (iii) performing the OS update; (iv) when the OS update causes an SE capability change for which a notification should be sent for a first profile of the one or more profiles, creating a capability change notification in the notification list for the first profile; and (v) providing one or more entries from the notification list to one or more mobile network operators (MNOs) associated with the one or more profiles.

In some embodiments, the providing includes sending the one or more entries from the notification list to network-based servers of the one or more MNOs over bearer independent protocol (BIP) channels. In some embodiments, the providing includes sending a refresh command to a local profile assistant (LPA) of a device that includes the SE to fetch the notification list that includes the one or more entries. In some embodiments, the LPA of the device sends notifications to one or more network-based servers of the MNOs based on the one or more entries in the notification list. In some embodiments, the method performed by the SE further includes comparing a first value associated with the first profile, the first value indicating those SE capabilities for which notifications should be sent, with a second value that indicates those SE capabilities that are affected by the OS update to determine whether the OS update causes the SE capability change for which the notification should be sent for the first profile. In some embodiments, the first value includes a linkedcapability value, and the second value includes a capabilitiyindication value.

In some embodiments, an apparatus is configurable for operation in a wireless device, and the apparatus includes a processor and a memory storing instructions that, when executed by the processor, cause a secure element (SE) of the wireless device to perform operations including: when an operating system (OS) update to the SE is pending and a first profile requires notification for the OS update (i) determining whether the notification is configured to occur before or after the OS update; and (ii) when the notification is configured to occur before the OS update: (a) adding a notification entry to a notification list, (b) providing the notification entry from the notification list to an MNO associated with the first profile, and (c) subsequent to providing the notification entry to the MNO, performing the OS update to the SE.

In some embodiments, the operations performed by the SE further include when the OS update to the SE is pending and the first profile requires notification for the OS update: (iii) when the notification is configured to occur after the OS update: (a) waiting for occurrence of the OS update, and (b) after occurrence of the OS update: adding the notification entry to the notification list, and providing the notification entry from the notification list to the MNO associated with the first profile. In some embodiments, the SE provides the notification entry to the MNO over a bearer independent protocol (BIP) channel between the SE and a server of the MNO. In some embodiments, the operations performed by the SE further include (iv) sending a refresh command to a local profile assistant (LPA) of the wireless device to fetch the notification list that includes the notification entry. In some embodiments, the LPA of the wireless device sends a notification to a server of the MNO based on the notification entry in the notification list. In some embodiments, the operations performed by the SE further include: (v) determining the first profile requires notification for the OS update by at least comparing a first value associated with the first profile, the first value indicating those SE capabilities for which notifications should be sent, with a second value that indicates those SE capabilities that are affected by the OS update. In some embodiments, the first value includes a linkedcapability value, and the second value includes a capabilitiyindication value.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A secure element (SE) of a cellular wireless communication device, the SE storing one or more profiles, the SE comprising:
   at least one processor; and
   a memory storing instructions that, when executed by the at least one processor, cause the SE to perform operations that include, for each profile of the one or more profiles managed by the SE:
      comparing (1) a first set of SE capabilities associated with the profile for which a notification should be sent, as indicated in a linked capability value included in the profile, when any of the SE capabilities are updated with (2) a second set of SE capabilities that are affected by an operating system (OS) update that targets the SE;
      for each SE capability included in both the first and second sets of SE capabilities:
         adding the SE capability to a respective notification list for the profile; and
      in response to determining that the respective notification list includes at least one SE capability:
         causing at least one notification based on the respective notification list to be provided to a server of a respective Mobile Network Operator (MNO) associated with the profile,
   wherein each profile comprises MNO data and applications provisioned to the cellular wireless communication device for access to cellular communication services of the respective MNO, the MNO data including an address for the server of the MNO to which notifications are to be sent.

2. The SE of claim 1, wherein the operations further comprise, for each profile of the one or more profiles managed by the SE, and prior to the operation of comparing:
   determining, based on notification configuration information indicated in a profile management operation value included in the profile, that notifications should be provided to the respective MNO.

3. The SE of claim 1, wherein:
   the linked capability value comprises a binary value, each bit of the binary value indicating whether an associated SE capability requires a notification to be sent.

4. The SE of claim 1, wherein, for at least one profile of the one or more profiles, the at least one notification is provided to the server of the respective MNO over a bearer independent protocol (BIP) channel established between the SE and the server of the MNO.

5. The SE of claim 1, wherein, for at least one profile of the one or more profiles, the at least one notification is provided to the server of the respective MNO by a local profile assistant (LPA) implemented on the cellular wireless communication device in which in the SE is included.

6. The SE of claim 5, wherein the operations performed by the SE further comprise, for at least one profile of the one or more profiles:
   sending a refresh command to the LPA to cause the LPA to obtain the respective notification list and to provide the at least one notification to the server of the respective MNO.

7. The SE of claim 6, wherein the server of the MNO comprises a network-based profile server of the respective MNO associated with the at least one profile.

8. A method implemented by a secure element (SE) of a cellular wireless communication device, the SE storing one or more profiles, the method comprising, for each profile of the one or more profiles managed by the SE:
   comparing (1) a first set of SE capabilities associated with the profile for which a notification should be sent, as indicated in a linked capability value included in the profile, when any of the SE capabilities are updated with (2) a second set of SE capabilities that are affected by an operating system (OS) update that targets the SE;
   for each SE capability included in both the first and second sets of SE capabilities:
      adding the SE capability to a respective notification list for the profile; and
   in response to determining that the respective notification list includes at least one capability:
      causing at least one notification based on the respective notification list to be provided to a server of a respective Mobile Network Operator (MNO) associated with the profile,
   wherein each profile comprises MNO data and applications provisioned to the cellular wireless communication device for access to cellular communication services of the respective MNO, the MNO data including an address for the server of the MNO to which notifications are to be sent.

9. The method of claim 8, further comprising, for each profile of the one or more profiles managed by the SE, and prior to comparing:
   determining, based on notification configuration information indicated in a profile management operation value included in with the profile, that notifications should be provided to the respective MNO.

10. The method of claim 8, wherein:
the linked capability value comprises a binary value, each bit of the binary value indicating whether an associated SE capability requires a notification to be sent.

11. The method of claim 8, wherein, for at least one profile of the one or more profiles, the at least one notification is provided to the server of the respective MNO over a bearer independent protocol (BIP) channel established between the SE and the server of the MNO.

12. The method of claim 8, wherein, for at least one profile of the one or more profiles, the at least one notification is provided to the server of the respective MNO by a local profile assistant (LPA) implemented on the cellular wireless communication device in which in the SE is included.

13. The method of claim 12, further comprising, for at least one profile of the one or more profiles:
sending a refresh command to the LPA to cause the LPA to obtain the respective notification list and to provide the at least one notification to the server of the respective MNO.

14. An apparatus configurable for operation in a cellular wireless communication device, the apparatus comprising:
a processor; and
a memory storing instructions that, when executed by the processor, cause a secure element (SE) of the cellular wireless communication device to, for each profile of the one or more profiles is stored in and managed by the SE:
compare (1) a first set of SE capabilities associated with the profile for which a notification should be sent, as indicated in a linked capability value included in the profile, when any of the SE capabilities are updated with (2) a second set of SE capabilities that are affected by an operating system (OS) update that targets the SE;
for each SE capability included in both the first and second sets of SE capabilities:
add the SE capability to a respective notification list for the profile; and
in response to determining that the respective notification list includes at least one SE capability:
cause at least one notification based on the respective notification list to be provided to a server of a respective Mobile Network Operator (MNO) associated with the profile,
wherein each profile comprises MNO data and applications provisioned to the cellular wireless communication device for access to cellular communication services of the respective MNO, the MNO data including an address for the server of the MNO to which notifications are to be sent.

15. The apparatus of claim 14, wherein the instructions further cause the SE to, for each profile of the one or more profiles managed by the SE, and prior to comparing:
determining, based on notification configuration information indicated in a profile management operation value included in with the profile, that notifications should be provided to the respective MNO.

16. The apparatus of claim 14, wherein:
the linked capability value comprises a binary value, each bit of the binary value indicating whether an associated SE capability requires a notification to be sent.

17. The apparatus of claim 14, wherein, for at least one profile of the one or more profiles, the at least one notification is provided to the server of the respective MNO over a bearer independent protocol (BIP) channel established between the SE and the server of the MNO.

18. The apparatus of claim 14, wherein, for at least one profile of the one or more profiles, the at least one notification is provided to the server of the respective MNO by a local profile assistant (LPA) implemented on the cellular wireless communication device in which in the SE is included.

19. The apparatus of claim 18, wherein the instructions further cause the SE to, for at least one profile of the one or more profiles:
sending a refresh command to the LPA to cause the LPA to obtain the respective notification list and to provide the at least one notification to the server of the respective MNO.

20. The apparatus of claim 19, wherein the server of the MNO comprises a network-based profile server of the respective MNO associated with the at least one profile.

* * * * *

UNITED STATES PATENT AND TRADEMARK OFFICE
CERTIFICATE OF CORRECTION

PATENT NO. : 10,769,279 B2  
APPLICATION NO. : 16/026912  
DATED : September 8, 2020  
INVENTOR(S) : Xiangying Yang Page 1 of 1

It is certified that error appears in the above-identified patent and that said Letters Patent is hereby corrected as shown below:

In the Claims

In Claim 9, at Column 14, Line 66: "included in with the profile," should read -- included in the profile, --.

In Claim 15, at Column 16, Line 16: "included in with the profile," should read -- included in the profile, --.

Signed and Sealed this  
Twentieth Day of October, 2020

Andrei Iancu  
*Director of the United States Patent and Trademark Office*